United States Patent
Ku et al.

(10) Patent No.: US 11,086,367 B2
(45) Date of Patent: Aug. 10, 2021

(54) COMPUTERS

(71) Applicant: Hewlett-Packard Development Company, L.P., Spring, TX (US)

(72) Inventors: Chung-Hua Ku, Taipei (TW); Chi-Hao Chang, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,787

(22) PCT Filed: Oct. 10, 2017

(86) PCT No.: PCT/US2017/055951
§ 371 (c)(1),
(2) Date: Mar. 19, 2020

(87) PCT Pub. No.: WO2019/074493
PCT Pub. Date: Apr. 18, 2019

(65) Prior Publication Data
US 2020/0285284 A1   Sep. 10, 2020

(51) Int. Cl.
*G06F 1/16* (2006.01)
*G11B 33/08* (2006.01)
(52) U.S. Cl.
CPC ........... *G06F 1/1658* (2013.01); *G11B 33/08* (2013.01)

(58) Field of Classification Search
CPC .................................. G06F 1/16; F16B 43/00
See application file for complete search history.

(56) References Cited

U.S. PATENT DOCUMENTS

| | | |
|---|---|---|
| 3,390,929 A | 7/1968 | Teresio |
| 3,890,480 A | 6/1975 | Berling et al. |
| 4,066,058 A | 1/1978 | Anderkay |
| 4,726,699 A | 2/1988 | Buschmann et al. |
| 4,758,712 A | 7/1988 | Matone, Jr. et al. |
| 2002/0043608 A1 | 4/2002 | Nakata et al. |
| 2006/0023416 A1* | 2/2006 | Chen ................... G06F 1/1613 361/679.4 |
| 2012/0027538 A1* | 2/2012 | Thau ................... F16B 43/001 411/371.1 |
| 2014/0299737 A1 | 10/2014 | Okumura |

FOREIGN PATENT DOCUMENTS

DE    4111680 A1    10/1992

* cited by examiner

*Primary Examiner* — Jerry Wu
(74) *Attorney, Agent, or Firm* — HP Inc. Patent Department

(57) ABSTRACT

Computers are disclosed. An example computer includes a casing including a first casing portion and a second casing portion; a fastener; and a biasing element surrounding the fastener, the fastener to couple the first casing portion and the second casing portion and the biasing element to deter vibrations transmitted from the first casing portion to the fastener from affecting internal components of the computer.

10 Claims, 5 Drawing Sheets

COMPUTERS

BACKGROUND

Portable computers may include a display portion and a keyboard portion. The display portion may be hingably coupled to the keyboard portion. In some examples, the keyboard portion includes a two-part casing that houses components of the portable computer.

Figure 1:
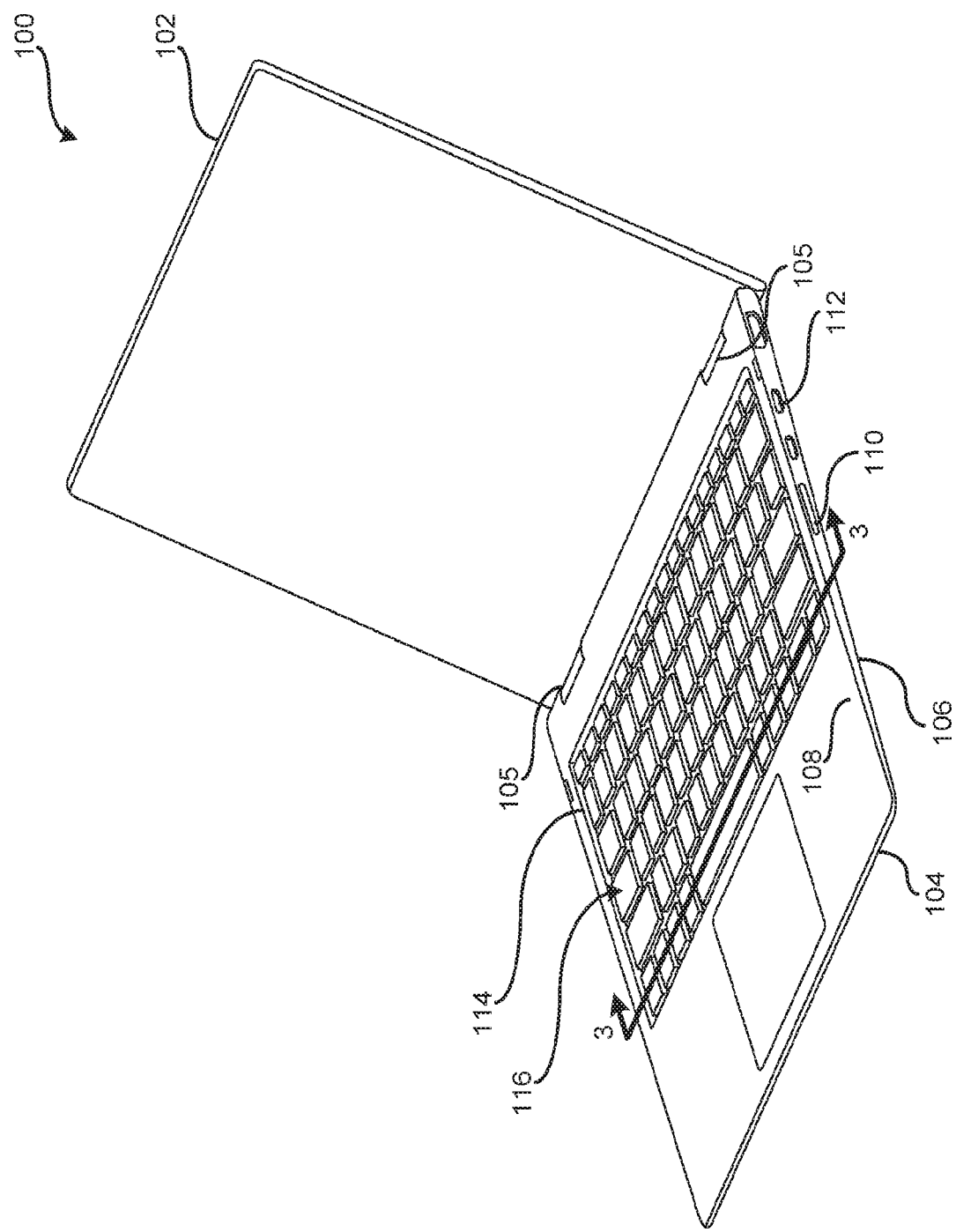
FIG. 1 is a top isometric view of an example computer implemented in accordance with the teachings of this disclosure.

The figures are not to scale. Wherever possible, the same reference numbers will be used throughout the drawing(s) and accompanying written description to refer to the same or like parts. While the drawings illustrate examples of computers, other examples may be employed to implement the examples disclosed herein.

DETAILED DESCRIPTION

The examples disclosed herein relate to computers and/or computing devices having portions that are coupled together using example fastener assemblies. In some examples disclosed herein, the fastener assemblies deter energy/vibrations (e.g., shocks) from affecting internal components (e.g., the hard drive) of the computer and, thus, increase the useful life of computers implemented in accordance with the teachings of this disclosure. Additionally, in some examples, the fastener assemblies reduce an amount of noise (e.g., rocking noise) generated by the computer by deterring relative movement and/or engagement between components of and/or within the computer.

In some examples, the fastener assemblies include an example shoulder screw, an example damper ring and an example lock washer that are used to couple upper and lower casing portions of a computer. In some examples, the upper and lower casing portions form a keyboard portion of the computer. To couple the upper and lower casing portions together, in some examples, the fastener is extended through the lower casing portion and the damper ring is positioned about the fastener. To couple the damper ring to the fastener, in some examples, the lock ring is positioned on a body of the fastener to capture the damper ring between the lower casing portion and the lock ring.

To couple the lower casing portion and the upper casing portion, in some examples, the fastener is received by the upper casing portion. The placement of the damper ring around the fastener and between the upper and lower casing portions enables vibrations and/or shock energy received by the lower casing portion to travel through the fastener and to damper ring, which is structured to absorb the vibrations and/or shock energy. Thus, based on the damper ring absorbing at least some of the vibrations and/or shock energy and/or the upper/lower casing portions not directly contacting one another at and/or adjacent to the fastener, the example fastener assemblies reduce an amount of vibration and/or shock energy to which the upper casing portion and/or other components of the computer are exposed.

In some examples, to enable the lower casing portion to rest flatly on, for example, a table, the example fastener assemblies are adjustable (e.g., self-adjustable) to change how feet of the lower casing portion contact the table below. In some examples, adjusting the fastener assemblies draws the upper and lower casing portions closer together causing the damper ring to be compressed between opposing surfaces of the upper and lower casing portions. In other examples, adjusting the fastener assemblies increases a distance between the opposing surfaces of the upper and lower casing portions and causes the damper ring to expand into the space formed between the opposing surfaces of the upper and lower casing portions. In other words, the damper ring fills the space formed between the upper and lower casing portions as the feet are adjusted to enable vibrations and/or shock energy to be absorbed by the damper ring and not, for example, the hard drive of the computer. In some examples, the example fastener assemblies deter portions of the casing from coming in direct contact with one another and, thus, deter noise from being generated between hard contact points of the upper and lower casing portions that may otherwise be provided but for the examples disclosed herein.

FIG. 1 illustrates an example computer 100 that can be used to implement the teachings of this disclosure. While FIG. 1 depicts a portable computer as embodying the teachings of this disclosure, the examples disclosed herein may be implemented in any other computing device, mobile device, electronic devices, etc. For example, the examples disclosed herein may be implemented in a server, a personal computer, a mobile device (e.g., a cell phone, a smart phone, a tablet such as an iPad®), a personal digital assistant (PDA), an Internet appliance or any other type of computing device.

In the illustrated example, the computer 100 includes a display portion 102 coupled to a keyboard portion 104 via a hinge 105. In some examples, the keyboard portion 104 is formed by the coupling of a first casing portion 106 and a second casing portion 108. As shown in the illustrated example, the keyboard portion 104 includes a subscriber identity module (SIM) card port 110, a universal serial bus (USB) port 112 and an aperture 114 through which a keyboard 116 extends.

Figure 2:
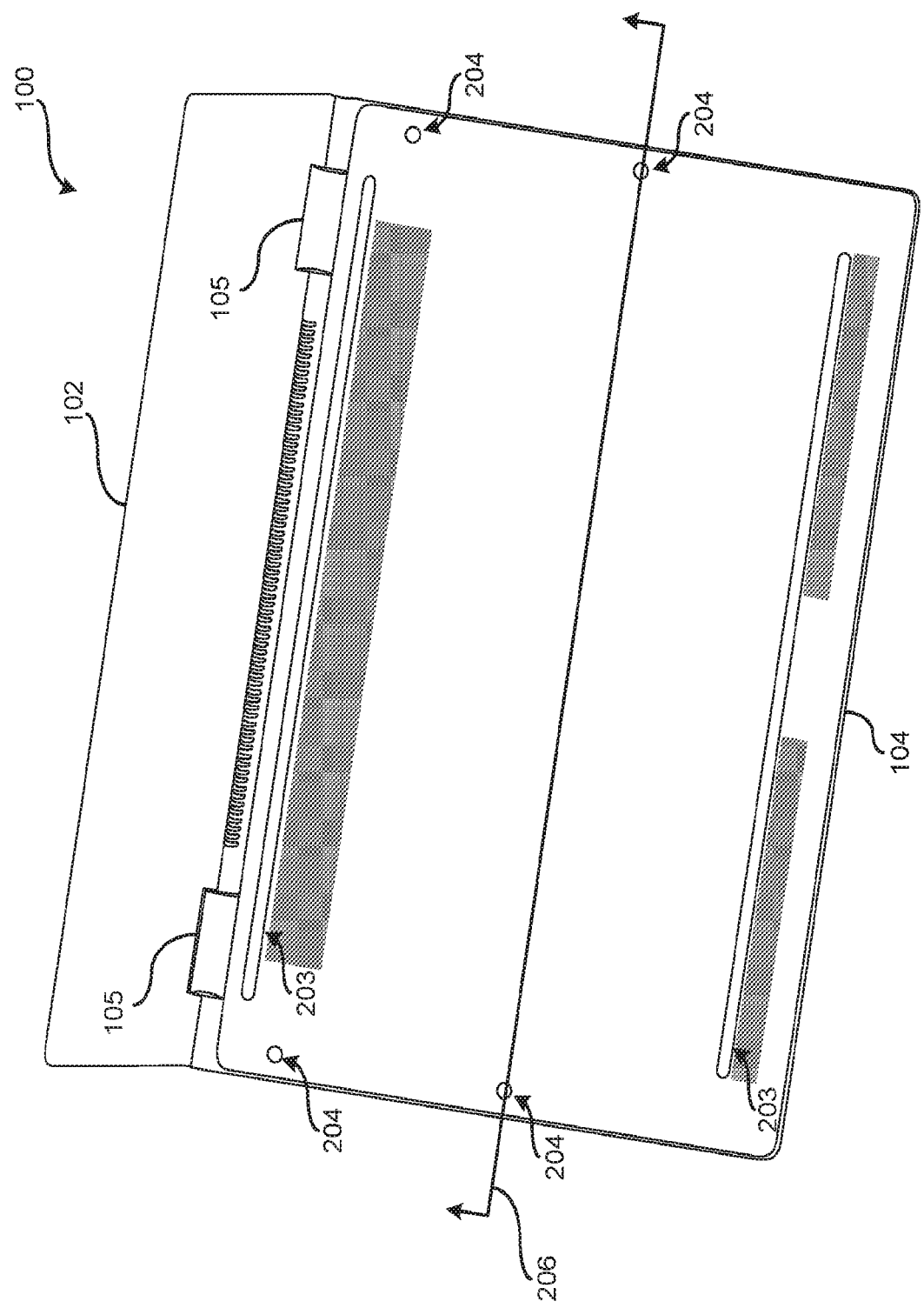
FIG. 2 illustrates a bottom-isometric view of the example computer of FIG. 1.

FIG. 2 illustrates a bottom view of the example computer 100 including the keyboard portion 104. In this example, the keyboard portion 104 includes feet 203 and is coupled using example fastener assemblies 204 as further described in FIG. 4. In this example, the feet 203 are spaced apart and are structured to rest and/or engage a table when the computer 100 is being used. In examples in which at least one of the feet 203 do not engage the surface of the table causing the computer 100 to rock and/or be unstable, one of the fastener assemblies 204 may be adjusted to change the distance between the first and second casing portions 106, 108 and to change a distance between the feet 203 and the table.

Figure 3:
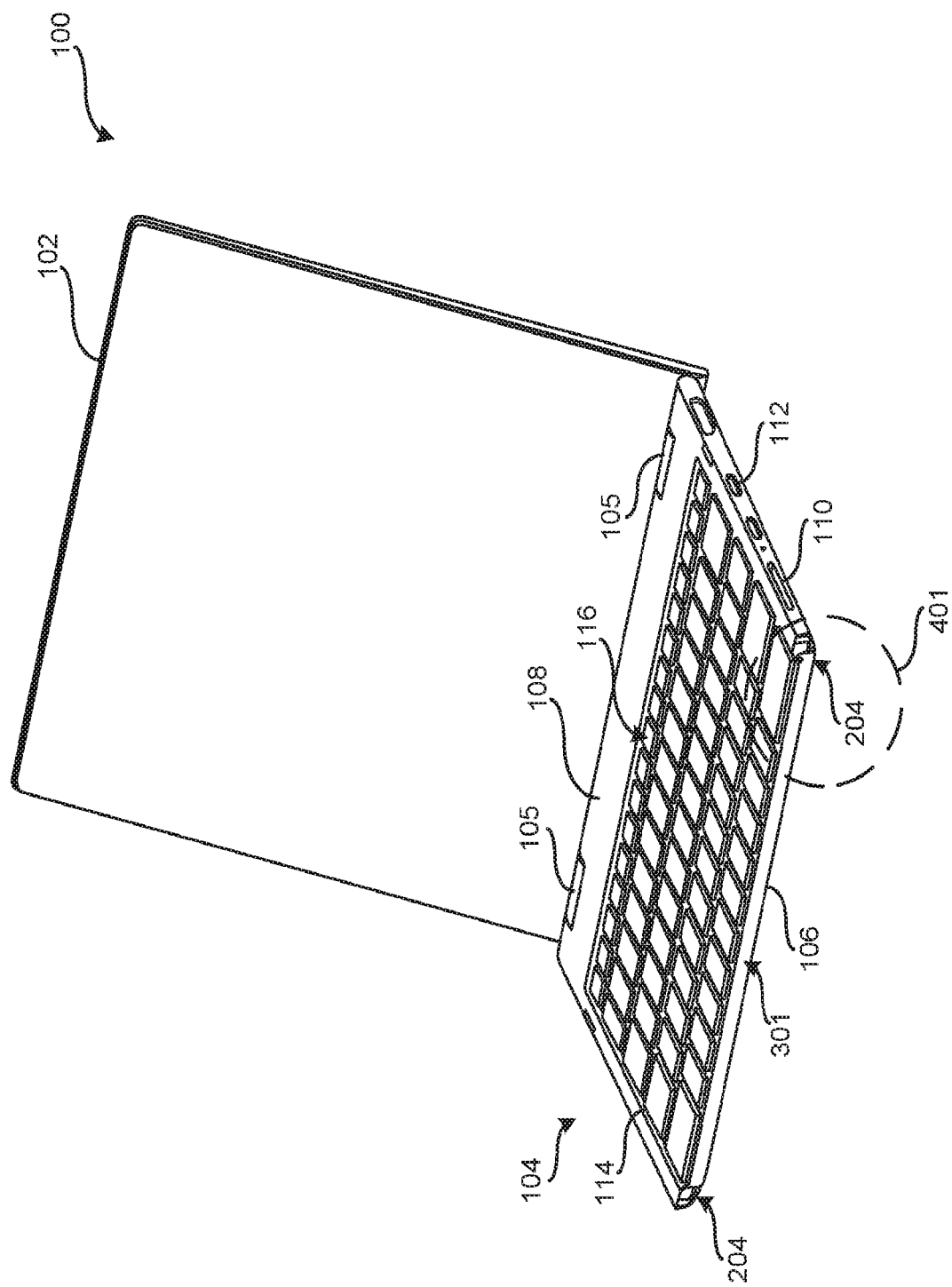
FIG. 3 illustrates a top view of the computer of FIG. 1 including a portion of an example keyboard portion cut way, the keyboard portion being formed of example casing portions.

FIG. 3 illustrates a top view of the computer 100 of FIG. 1 including a portion of the keyboard portion 104 cut way along lines 3-3 of FIG. 1 and shown at reference number 206 of FIG. 2. As shown in the illustrated example, the keyboard portion 104 defines a cavity 301 that houses components used to provide functionality to the computer 100 such as, for example, a hard drive of the computer 100. To deter shock energy/vibrations from being received by the components (e.g., the hard drive) of the computer 100 and/or to reduce an amount of noise (e.g., rocking noise) that would otherwise be created by the engagement and/or movement of hard contact points of the first casing portion 106 and the second casing portion 108, in this example, the first and second casing portions 106, 108 are coupled together using the example fastener assemblies 204.

Figure 4:
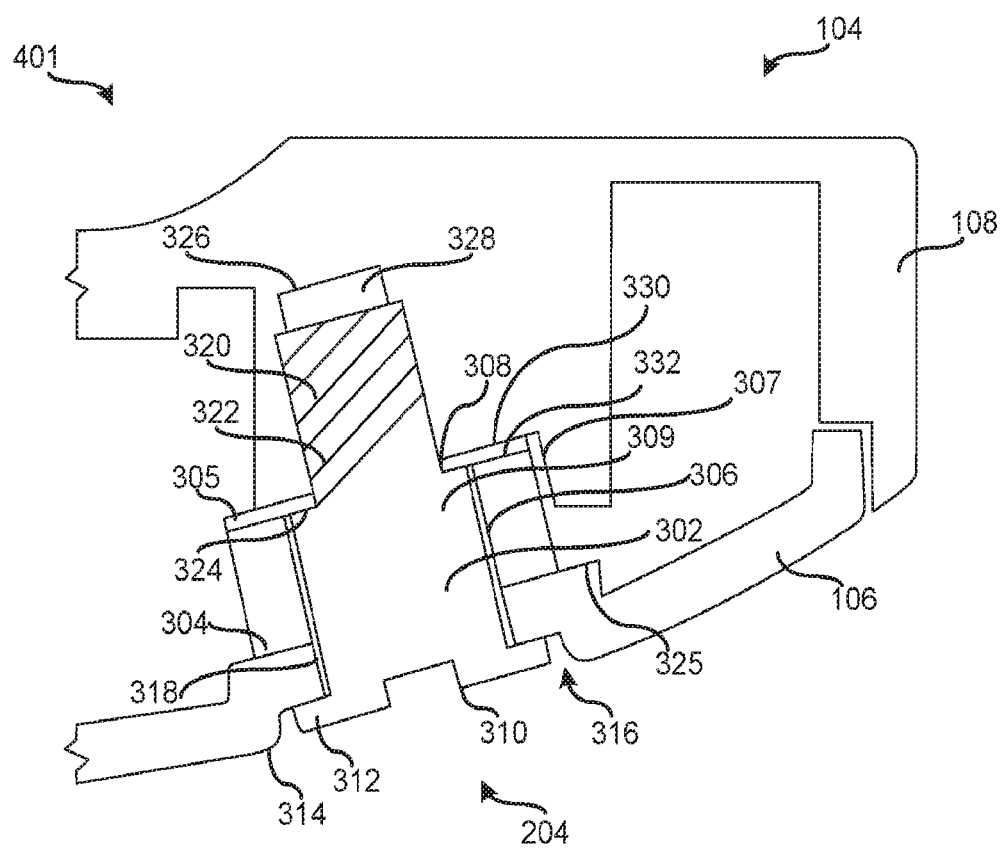
FIG. 4 illustrates a detailed view of an example fastener assembly used to couple casing portions of the computer of FIG. 1 together.

FIG. 4 illustrates a detailed cross-sectional view of one of the fastener assemblies 204 taken at reference number 401 of FIG. 3. In this example, the fastener assembly 204 includes an example fastener 302, an example biasing element 304 and an example lock 305.

The biasing element 304 may have a torus shape, a cylindrical shape, etc. The biasing element 304 may be implemented as a damper ring including a vibration damping and shock absorbing material such as 3M™ E-A-R™. Additionally or alternatively, the biasing element 304 may be a thermoplastic material, a thermoplastic elastomer and/or a highly damped thermoplastic molded material structured for noise, shock and/or vibration control. In some examples, the biasing element 304 has a hardness of ASTM D2240 Type A Durometer 23 C (73 F) 15 sec impact of between about 35 and 95. In some examples, the biasing element 304 has a compression load deflection of ASTM D575 at 0.51 cm/min (0.2 in/min) at 10 percent of between about 324 kilopascal (kPa) and 3619 kPa. In some examples, the biasing element 304 has a compression load deflection of ASTM D575 at 0.51 cm/min (0.2 in/min) at 20 percent of between about 627 kPa and 6494 kPa. In some examples, the biasing element 304 has a compression load deflection of ASTM D575 at 0.51 cm/min (0.2 in/min) at 30 percent of between about 958 kPa and 9087 kPa. In some examples, the biasing element 304 has a tensile strength (ASTM D412) of 3309 kPa and 11279 kPa. In some examples, the biasing element 304 has a tear strength (ASTM D624) of between about 18 kilonewton meters (kN/m) and 72 kN/m. However, the biasing element 304 may be implemented in any other way. For example, the biasing element 304 may have a single durometer such as, for example, between about 40 and 60. Alternatively, the biasing element 304 may be composite with a different durometer such as, for example, between about 40 and 80. In some examples, the compression range is around 50+/−25%.

The lock 305 may be implemented as a lock ring that is structured to cause the biasing element 304 to remain coupled to the fastener 302 when the fastener 302 is decoupled from the second casing portion 108 and to deter the fastener 302 and/or biasing element 304 from being lost. However, the lock 305 may be implemented in any other way.

In this example, the biasing element 304 defines an aperture 306 sized to enable the fastener 302 to extend through the biasing element 304 and for the biasing element 304 to surround the fastener 302. When the first and second casing portions 106, 108 are coupled together using the fastener 302 and the biasing element 304 is surrounding the fastener 302 between the first and second casing portions 106, 108, in the illustrated example, the biasing element 304 is received in an example notch or stepped area 307 defined by the second casing portion 108. In this example, the lock 305 defines an aperture 308 sized to enable the fastener 302 to extend through the lock 305 and for the lock 305 to surround the fastener 302.

In the illustrated example, the fastener 302 includes an example head 309 including a groove 310 to receive a tool and a shoulder 312 structured to engage a first surface 314 of the first casing portion 106. In this example, the first casing portion 106 includes a recessed portion 316 that receives the shoulder 312 to deter the fastener 302 from extending outside of a dimensional envelope of the first casing portion 106 when the fastener 302 couples the first and second casing portions 106, 108. Additionally, in this example, the first casing portion 106 defines an aperture 318 through which the fastener 302 extends. To enable the fastener 302 to threadably engage the second casing portion 108, in this example, the fastener 302 includes a body 320 having threads 322. To enable the lock 305 to be captured and retained between the head 309 of the fastener 302 and the second casing portion 108 when the fastener 302 couples the first and second casing portions 106, 108, in this example, the fastener 302 includes an example second shoulder 324 on which the lock 305 rests and/or engages.

In some examples, the fastener assemblies 204 may be adjusted by rotating the fastener 302 to increase a space formed between the first and second casing portions 106, 108 to enable the biasing element 304 to expand into the space formed between the first and second casing portions 106, 108. In other examples, the fastener assemblies 204 may be adjusted by rotating the fastener 302 to decrease a space formed between the first and second casing portions 106, 108 to cause the biasing element 304 to contract within the lesser amount of space provided between the first and second casing portions 106, 108. Regardless of whether the biasing element 304 is biased or compressed (e.g., deformed), the biasing element 304 is structured to deter vibrations and/or other energy (e.g., mechanical energy) from affecting the computer 100, deter the first and second casing portions 106, 108 from engaging one another (e.g., directly contacting one another) immediately adjacent the fastener 302, increase the useful life of the computer 100 and/or reduce the noise created by parts that would engage but for the inclusion of the example biasing element 304.

As shown in the example of FIG. 4, to couple the first and second casing portions 106, 108 using the example fastener assembly 204, the fastener 302 is positioned through the aperture 318 of the first casing portion 106, the biasing element 304 is positioned around the fastener 302 to engage a second surface 325 of the first casing portion 106 and the lock 305 is positioned around the body 320 of the fastener 302 to engage the second shoulder 324 of the fastener 302. In some examples, the lock 305 forms a friction fit and/or interface fit with the fastener 302 that deters the lock 305 from being removed from the fastener 302 once positioned thereon.

To couple the fastener 302 and the second casing portion 108, a tool is inserted into the groove 310 of the fastener 302 and rotated to cause the threads 322 to threadably engage a third surface 326 defining an aperture 328 of the second casing portion 108. In this example, the fastener 302 is threaded into the second casing portion 108 until the lock 305 engages a fourth surface 330 of the second casing portion 108. The lock 305 may be biased by the biasing element 304. In some examples, to deter the lock 305 from being removed from the fastener 302 once installed, the lock 305 is positioned in a groove 332 formed between the second casing portion 108 and the biasing element 304. In some examples, the engagement between the first casing portion 106, the fastener 302, the lock 305 and the second casing portion 108 enables energy, vibrations, etc. imparted on the first casing portion 106 to be absorbed by the biasing element 304, thereby enabling less of the energy, vibrations, etc. to be received by the second casing portion 108 and/or other components of the computer 100.

Figure 5:
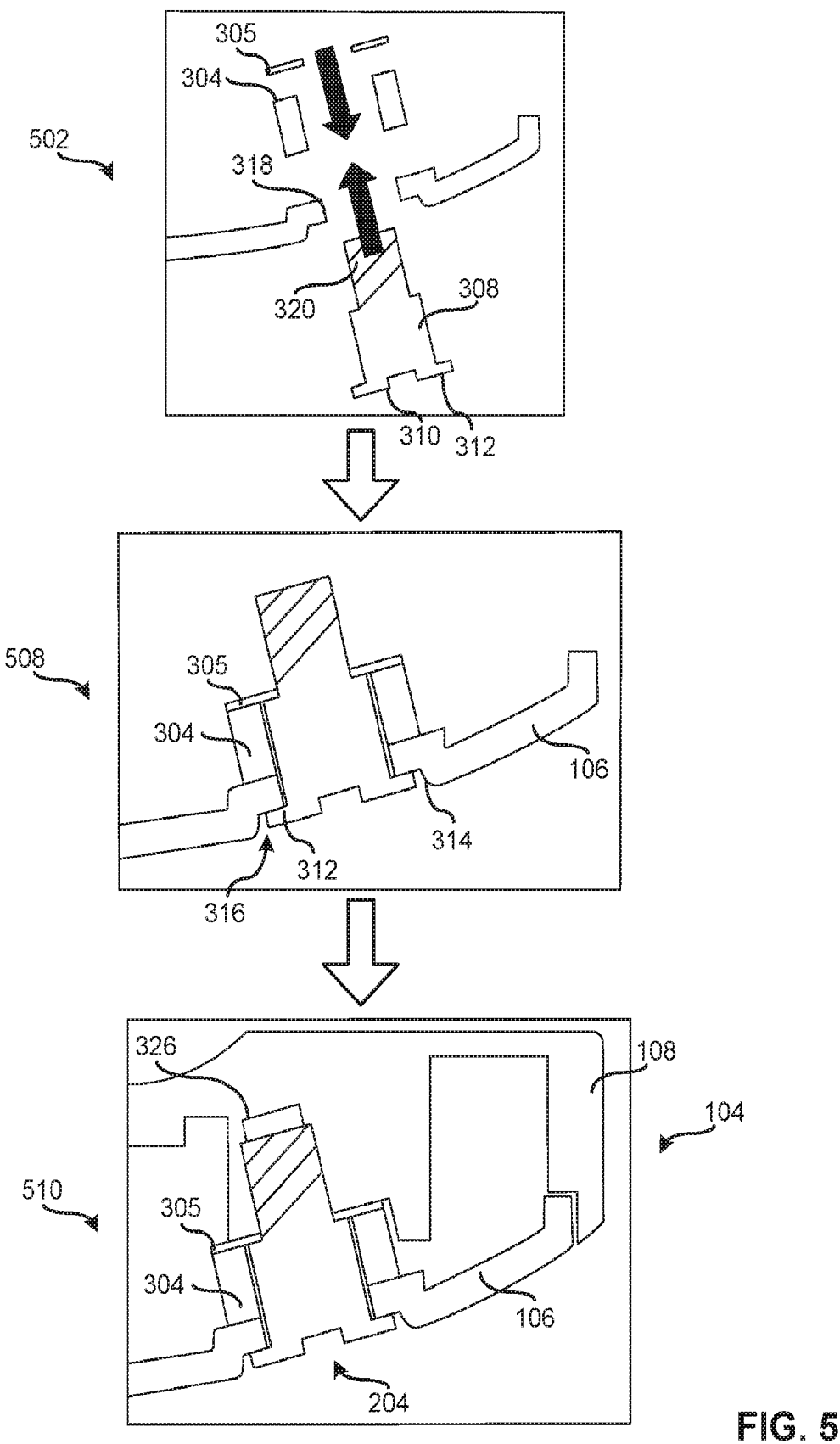
FIG. 5 illustrates a series of views showing processes of coupling casing portions together using an example fastener assembly.

FIG. 5 illustrates figures of different stages of coupling the first and second casing portions 106, 108 using the example fastener assembly 204 of FIGS. 2-4. At reference number 502, the fastener 302 is positioned to extend through the aperture 318 of the first casing portion 106 and the biasing element 304 and the lock 305 are positioned to receive the body 320 of the fastener 302. At reference number 508, the faster 302 is illustrated extending through the aperture 318 of the lower casing portion 106 with the shoulder 312 of the fastener 302 engaging the first surface 314 of the first casing portion 106 and the biasing element 304 disposed between the lock 305 and the first casing portion 106. At reference number 510, the fastener 302 is illustrated threadably engaging the third surface 326 of the second casing portion 108 and the biasing element 304 positioned to absorb energy and/or to deter movement (e.g., noisy movement) between the first casing portion 106, the second casing portion 108, the fastener assembly 204, etc.

From the foregoing, it will be appreciated that the above disclosed methods, apparatus and articles of manufacture relate to fastener assemblies that deter vibrations from affecting internal components of computing devices such as, for example, personal computers. The examples disclosed herein also enable feet of such computing devices to be adjusted all while enabling vibrations to be absorbed.

Example 1

An example computer includes a casing including a first casing portion and a second casing portion; a fastener; and a biasing element surrounding the fastener, the fastener to extend through the first casing portion and to threadably engage the second casing portion, the biasing element to be positioned between the first casing portion and the second casing portion to deter the first and second casing portions from engaging one another immediately adjacent the fastener and to deter vibrations transmitted from the first casing portion to the fastener from affecting internal components of the computer.

Example 2

In Example 1 or other examples, the biasing element fills a space between the first casing portion and the second casing portion to deter the vibrations transmitted from the first casing portion to the fastener from affecting the internal components of the computer.

Example 3

In Example 1, 2 or other examples, the biasing element is structured to deform in response to the fastener being adjusted to change a distance between the first and second casing portions.

Example 4

In Examples 1, 2, 3 or other examples, the apparatus may further include a lock to secure the biasing element to the fastener.

Example 5

In Example 4 or other examples, the lock is a lock ring.

Example 6

In Examples 4, 5 or other examples, further including a groove formed between the second casing portion and the fastener, the groove to receive the lock, an interaction between the fastener, the lock, and the biasing element to enable the vibrations transmitted from the first casing portion to the fastener to be received by the biasing element.

Example 7

In Examples 4, 5 or other examples, the fastener includes a head and a body, the head including a first shoulder to engage the first casing portion when the fastener couples the first and second casing portions, a second shoulder of the fastener being defined between the head and the body, a groove to be formed between the second shoulder and the second casing portion to capture the lock therebetween, the biasing element to be disposed between the lock and the first casing portion.

Example 8

In Example 7 or other examples, when the fastener couples the first and second casing portions, the first casing portion is positioned between the first shoulder and the biasing element, the biasing element is positioned between the first casing portion and the lock, the lock is positioned between the biasing element and the second casing portion, and the fastener threadably engages the second casing portion.

Example 9

In Examples 7, 8 or other examples, the fastener is adjustable to change a space between the first casing portion and the second casing portion, the biasing element is structured to expand or compress to fill the space between the first and second casing portions.

Example 10

In Examples 7, 8, 9 or other examples, the first casing portion includes a recessed portion defining an aperture, the first shoulder to be received within the recessed portion, the fastener to extend through the aperture.

Example 11

In Examples, 1, 2, 3, 4, 5, 6, 7, 8, 9, 10 or other examples, the biasing element is a damper ring.

Example 12

In Examples, 1, 2, 3, 4, 5, 6, 7, 8, 9, 10, 11 or other examples, the apparatus may include a display portion and a keyboard portion, the keyboard portion formed by the first and second casing portions, the keyboard portion coupled to the display portion.

Example 13

In Example 12 or other examples, the keyboard portion is hingably coupled to the display portion.

Example 14

An apparatus including a casing including a first casing portion and a second casing portion; a fastener, the fastener to couple the first casing portion and the second casing portion; and means for deterring vibrations transmitted from the first casing portion to the fastener from affecting internal components of the apparatus.

Example 15

In Example 14 or other examples, the means for deterring vibrations includes a biasing element surrounding the fastener, the biasing element to fill a space between the first casing portion and the second casing portion to deter the vibrations transmitted from the first casing portion to the fastener from affecting the internal components of the apparatus.

Example 16

In Example 15 or other examples, the biasing element includes a thermoplastic material.

Example 17

In Example 16 or other examples, the thermoplastic material is structured for noise control, shock control, or vibration control to deter the vibrations transmitted from the first casing portion to the fastener from affecting the internal components of the apparatus.

Example 18

An example computer, includes a casing including a first casing portion and a second casing portion; a fastener; and a biasing element surrounding the fastener, the fastener to extend through the first casing portion and to engage the second casing portion, the biasing element to be positioned between the first casing portion and the second casing portion to deter the first and second casing portions from engaging one another immediately adjacent the fastener and to deter vibrations transmitted from the first casing portion to the fastener from affecting internal components of the computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A computer, comprising:
   a casing including a first casing portion and a second casing portion;
   a fastener, the fastener including:
      a head;
      a first shoulder, the first shoulder to engage the first casing portion when the fastener couples the first and second casing portions;
      a body with threads;
      a second shoulder between the head and the body;
   a lock located between the second casing portion and the second shoulder of the fastener; and
   a biasing element around the fastener, the fastener to extend through the first casing portion and to engage the second casing portion by the threads, the biasing element to be positioned between the first casing portion and the lock to deter the first and second casing portions from engaging one another immediately adjacent the fastener, to deter vibrations transmitted from the first casing portion to the fastener from affecting internal components of the computer, and to be compressible between the lock and the first casing portion.

2. The computer of claim 1, wherein the biasing element fills a space between the first casing portion and the second casing portion to deter the vibrations transmitted from the first casing portion to the fastener from affecting the internal components of the computer.

3. The computer of claim 1, wherein the biasing element is structured to deform in response to the fastener being adjusted to change a distance between the first and second casing portions.

4. The computer of claim 1, further including a groove formed between the second casing portion and the fastener, the groove to receive the lock, an interaction between the fastener, the lock, and the biasing element to enable the vibrations transmitted from the first casing portion to the fastener to be received by the biasing element.

5. The computer of claim 1, wherein when the fastener couples the first and second casing portions, the first casing portion is positioned between the first shoulder and the biasing element, the biasing element is positioned between the first casing portion and the lock, the lock is positioned between the biasing element and the second casing portion, and the fastener threadably engages the second casing portion.

6. The computer of claim 1, wherein the fastener is adjustable to change a space between the first casing portion and the second casing portion, the biasing element is structured to expand or compress to fill the space between the first and second casing portions.

7. The computer of claim 1, wherein the first casing portion includes a recessed portion defining an aperture, the first shoulder to be received within the recessed portion, the fastener to extend through the aperture.

8. The computer of claim 1, wherein the biasing element is a damper ring.

9. The computer of claim 1, further including a display portion and a keyboard portion, the keyboard portion formed by the first and second casing portions, the keyboard portion coupled to the display portion.

10. The computer of claim 9, wherein the keyboard portion is hingably coupled to the display portion.

* * * * *